• (12) United States Patent
Fontes et al.

(10) Patent No.: US 7,058,718 B2
(45) Date of Patent: Jun. 6, 2006

(54) BLENDED SYN COOKIES

(75) Inventors: Stephen M. Fontes, Morrisville, NC (US); John R. Hind, Raleigh, NC (US); Thomas Narten, Durham, NC (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/050,021

(22) Filed: Jan. 15, 2002

(65) Prior Publication Data

US 2003/0135625 A1 Jul. 17, 2003

(51) Int. Cl.
*G06F 15/173* (2006.01)
(52) U.S. Cl. .............. 709/228; 709/227; 709/229; 709/237; 726/26; 370/254
(58) Field of Classification Search .......... 709/227, 709/224, 228, 229; 713/200, 201, 151–157, 713/169; 370/254; 726/26
See application file for complete search history.

(56) References Cited

U.S. PATENT DOCUMENTS 6,587,438 B1 * 7/2003 Brendel ................ 370/254
6,779,033 B1 * 8/2004 Watson et al. ........... 709/227
2002/0103916 A1 * 8/2002 Chen et al. .............. 709/229

OTHER PUBLICATIONS

S. Thomason, *Building Blocks of Linux Packet Filtering In The 2.2 Kernel*, <http://www.linuxsecurity.com/resource_files/firewalls/linux-packet-filtering-2.2.html>, (Oct. 8, 2001).
S. Gibson, *A Simple TCP/IP Implementation Enhancement To Eliminate Denial Of Service (DoS) Vulnerability*, Parts I and II, *Gibson's Encryption-Enhanced Spoofing Immunity System*, <http://grc.com/r&d/nomoredos.htm> (Oct. 8, 2001).
NAT—Computer Networking, <http://compnetworking.about.com/library/glossary/bldef-nat.htm?terms=nat>, (Oct. 12, 2001).
D.J. Bernstein, *SYN Cookies*, <http://cr.yp.to/syncookies.html>, (Oct. 8, 2001).

* cited by examiner

*Primary Examiner*—Jeffrey Pwu
(74) *Attorney, Agent, or Firm*—Stephen A. Calagero; Steven M. Greenberg; Christopher & Weisberg, P.A.

(57) ABSTRACT

A method of producing a blended SYN cookie can include identifying within a SYN packet a source network address and desired communications session parameters. Subsequently, an index value into a table of pre-configured sets of communications session parameters can be retrieved. Notably, the index value can reference one of the sets which approximates the desired communications parameters. A hash value can be computed based upon the source network address, a constant seed and current date and time data. Finally, the computed hash value can be combined with the index value, the combination forming the blended SYN cookie.

15 Claims, 3 Drawing Sheets

BLENDED SYN COOKIES

BACKGROUND OF THE INVENTION

1. Statement of the Technical Field

The present invention relates to the field of network security and more particularly to the use of synchronization (SYN) cookies in a transmission control protocol three-way handshake.

2. Description of the Related Art

Internet security has increasingly become the focus of both corporate and home computer users who participate in globally accessible computer networks. In particular, with the availability and affordability of broadband Internet access, even within the home, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet hackers, crackers and script kiddies, collectively referred to as "malicious hackers".

Notably, many such unauthorized intruders continuously scan the Internet for Internet Protocol (IP) addresses and ports of vulnerable computers communicatively linked to the Internet. At the minimum, those vulnerable computers can experience nuisance damage such as accessed, deleted or modified files or defaced Web pages. Yet, at the other extreme, for the unsuspecting end-user their computer can become the staging area for "zombies" with which more malicious attacks can be launched resulting in the crippling of whole segments of the Internet.

Malicious hackers often exploit well-known characteristics of the Transport Control Protocol (TCP) in order to cause segments of the Internet to deny service to other, legitimate users of the Internet. The most commonplace type of "denial of service" (DoS) attack is the TCP synchronization (SYN) flood. A SYN flood operates by falsifying an unusually large number of TCP connections to an Internet server. Those clients which initiate the SYN flood quickly exhaust the inbound connection resources available to the Internet server, resulting in the inability of the Internet server to accept valid connections from legitimate clients.

TCP-based communications between two different network entities initially can be established through the well-known three-way handshake. In the TCP three-way handshake, a client initially can request a TCP connection by transmitting a SYN packet to the intended server. The initial SYN packet can contain the IP address of the client and an initial packet sequence number determined solely by the client. The server can receive the SYN packet and can respond to the specified IP address with a combined acknowledgment (ACK) and SYN packet. This SYN/ACK packet can contain an acknowledgment of the client's selected initial packet sequence number in addition to an initial packet sequence number determined solely by the server. Finally, the client can acknowledge the initial packet sequence number selected by the server by transmitting to the server an ACK packet containing both the client and server selected initial packet sequence numbers. As will be apparent to one skilled in the art, the final ACK packet contains all state information necessary to establish a TCP connection. Notwithstanding, in a conventional TCP three-way handshake, the server can allocate internal resources for tracking the state information of the connection upon receipt of the initial SYN packet.

In a conventional DoS SYN flood attack, a malicious hacker can transmit multiple SYN requests containing spoofed IP addresses so that the target server exhausts internal resources allocating the state data for each maliciously transmitted SYN packet. The server cannot defend against such attacks inasmuch as the server cannot always distinguish between legitimate and illegitimate IP addresses contained in SYN packets. Furthermore, the server becomes paralyzed and cannot accept new TCP connections because its resources have become hopelessly consumed in consequence of the receipt of the malicious SYN packets.

In an effort to address the challenges associated with DoS SYN flood attacks, D. J. Bernstein developed a modified three-way handshake based upon what Bernstein referred to as a "SYN cookie". A SYN cookie is a particular choice of an initial TCP packet sequence number selected by the server. In a typical SYN cookie, the five most significant bits are determined according to the equation, t mod 32, wherein the variable t is a thirty-two bit time counter which increments every sixty-four seconds. Notably, the next three bits represent the encoding of the TCP Maximum Segment Size (MSS) parameter. Finally, the least significant twenty-four bits represent a server-selected hash of the requesting client's IP address and port number, the server IP address and port number, and the variable t.

In the Bernstein method, the state of a requested TCP connection need not be stored upon receipt of the initial SYN packet. Rather, the required state information can be reproduced based upon an inspection of the finally received ACK packet transmitted by the requesting client. Hence, resources need not be allocated in the server until the conclusion of the three-way handshake. Moreover, the SYN cookie can be used to authenticate the requesting client by comparing the client IP address in the ACK packet with the IP address encoded in the SYN cookie. In consequence, the Bernstein method can be used to immunize a server from a DoS SYN flood attack. Notwithstanding, the Bernstein method is deficient in that the composition of the SYN cookie restricts the range of values for the MSS parameter.

Despite the advantages of the straight-forward application of SYN cookies, malicious hackers have been able to circumvent the protection afforded by SYN cookies. For instance, the composition of the SYN cookie permits the casual observer to decrypt the hash merely by observing a small sampling of valid traffic between the server and its clients. To address the inherent deficiencies in the Bernstein method, Steve Gibson improved upon the Bernstein method in his Genesis technology developed in January of 2001.

To address the vulnerability of the SYN cookie, in Genesis encrypted tokens are used in lieu of SYN cookies, though state information still is not stored until the final receipt of the ACK packet. Genesis, however, lacks support for client specified TCP parameters. Accordingly, in the Genesis scheme, communications sessions operate at the lowest common denominator of supported communications parameters including the smallest selected MSS value. In consequence, the use of the Genesis scheme can inhibit the performance of TCP communications between clients and servers. In fact, where large segment sizes are required to provide enhanced throughput for bulk data transfers, the performance can be even worse.

Significantly, both the Bernstein and Gibson methods are known to be ineffective where a malicious hacker installs a zombie process in a target server which permits one to bypass the TCP three-way handshake and communicate directly with the network device drivers through a raw sockets interface. This type of hacking attack has been referred to as a "quasi-TCP" attack. Though many firewalls perform packet inspection and packet filtering, packet inspection and filtering typically occur only during the setup of the TCP connection. Subsequent packets are assumed to be "safe". Of course, where the TCP three-way handshake has been bypassed, as in the case of a quasi-TCP attach, this is a poor assumption. Accordingly, what is needed is a more effective method of combating DoS flood and quasi-TCP attacks.

SUMMARY OF THE INVENTION

The present invention is a method and system for preventing a DoS flood attack which addresses the deficiencies of prior art methods and systems including Genesis and SYN cookie techniques. In the present invention, not only are network servers immunized from SYN and ACK flood attacks, but also network servers are secure from attacks which bypass the TCP three-way handshake. Finally, the present invention permits both clients and servers to nominate a full range of session parameters and is not limited to the least common denominator of session parameters specified by the server.

In one aspect of the present invention, a blended SYN cookie can be produced for use in a three-way handshake process. In particular, a method of producing a blended SYN cookie can include identifying within a SYN packet a source network address and desired communications session parameters. Subsequently, an index value into a table of pre-configured sets of communications session parameters can be retrieved. Notably, the index value can reference one of the sets which approximates the desired communications parameters.

A hash value can be computed based upon the source network address, a constant seed and current date and time data. Finally, the computed hash value can be combined with the index value, the combination forming the blended SYN cookie. Notably, the combining step can include reducing the computed hash value by N most significant binary digits to accommodate N binary digits required to represent the index value; and, combining the reduced hash value with the index value, the combination forming the blended SYN cookie.

The present invention also can include a three-way handshake method which utilizes the blended SYN cookies. In particular, the three-way handshake can include an initial request, an intermediate response to the initial request, and a final acknowledgment of the intermediate response. In this regard, the method can include extracting synchronization data from the initial request; storing the synchronization data in a fixed length, wrap-around table; and, based upon session parameters contained in the synchronization data, acquiring an index into a table of pre-configured sets of session parameters. An initial hash value can be computed based upon at least part of the synchronization data. Subsequently, the initial hash value and the acquired index can be combined and placed into the intermediate response to the initial request.

Importantly, responsive to receiving the final acknowledgment of the intermediate response, acknowledgment data can be extracted from the final acknowledgment. In consequence, the initial hash value can be identified in the acknowledgment data, and a new hash value can be computed based upon at least part of the acknowledgment data. Subsequently, the new hash value can be compared with the initial hash value. If the hash values do not match, the final acknowledgment can be discarded. Conversely, if the hash values match, the session parameters can be located in the fixed length, wrap-around table and a communications session can be established using the located session parameters.

Notably, if the session parameters cannot be located, the acquired index can be identified in the acknowledgment data. As a result, a pre-configured set of communication parameters can be retrieved based upon the acquired index. Once the pre-configured set of communication parameters has been retrieved, a communications session can be established using the located session parameters. In one aspect of the invention, the session parameters in the synchronization data can be observed; and, the table of pre-configured sets of session parameters can be tuned based upon the observed session parameters.

Importantly, the establishing step can include adding a mapping in a network address translation (NAT) process between a source end-point of the initial request and a destination end-point specified in the synchronization data; performing a three-way handshake with the destination end-point; and, routing data in the NAT between the source and destination end-points. In particular, the three-way handshake can include the steps of generating a SYN request containing data reconstructed from the initial request, receiving a SYN/ACK response, computing a server packet sequence number offset based upon a sequence number specified in the SYN/ACK and the combination; modifying the acknowledgment data with the offset, and forwarding the acknowledgment data as an ACK to the destination end-point. In consequence, a communications link can be established between said source and destination end-points.

A communications handshake system which has been configured in accordance with the inventive arrangements can include a communications process configured to receive and respond to requests to establish data communications sessions. The requests can include SYN packets and ACK packets. The system further can include a fixed length, wrap-around table configured to store desired session parameters extracted from the SYN packets, and a table of pre-configured session parameters which can be used to approximate the desired session parameters. Finally, the system can include a blended SYN cookie generator configured to combine SYN cookies with an index into the table of pre-configured session parameters, the index referencing a set of pre-configured session parameters which approximate corresponding ones of the desired session parameters. In one aspect of the invention, the SYN cookie can include a hash value computed from a network address, a seed value and a date and time value.

In the system of the invention, the communications process can authenticate the ACK packets by comparing hash values contained in the SYN cookies with hash values generated in response to receiving the ACK packets. The communications process also can establish the data communication sessions using either the desired session parameters in the fixed length, wrap-around table, or the approximated session parameters where the desired session parameters are not found in the fixed length wrap-around table. Notably, the system also can include a network address translator configured to perform network address translation between end-points in the established communications sessions.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
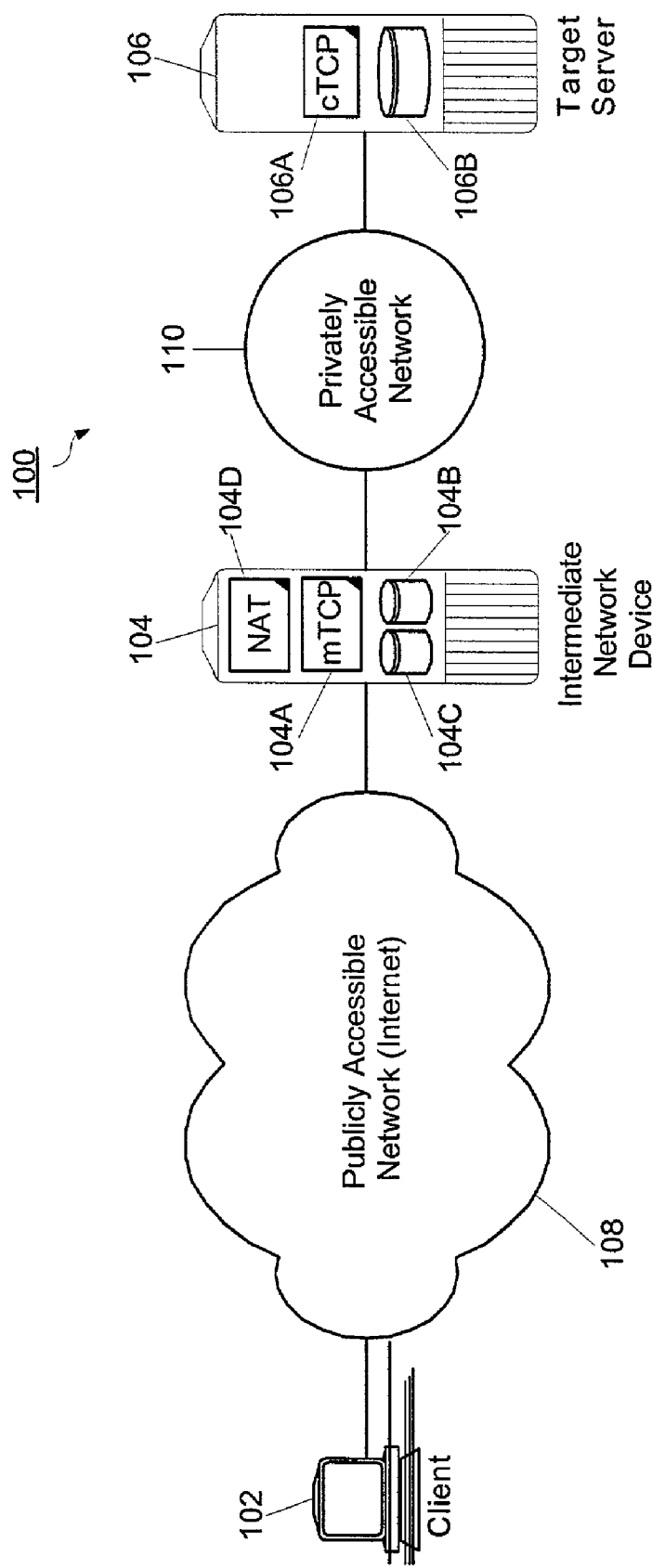
FIG. 1 is a pictorial illustration of a system configured to withstand both a TCP SYN or ACK flood attack and a quasi-TCP attack.

The present invention is a novel and non-obvious method and system for protecting a privately-accessible network from SYN and ACK flood attacks and from unauthorized intrusions based upon quasi-TCP connections with zombie processes. Importantly, unlike the Bernstein and Gibson methods of the prior art, in the present invention TCP connection parameters are not limited to the least common denominator of client and server specified TCP connection parameters. Rather, in the present invention TCP connections can be established based upon client specified TCP connection parameters. Furthermore, even in the event of a SYN or ACK flood attack, TCP connection parameters can be selected for legitimate TCP connections according to a close approximation of selected parameters stored in a "blended SYN cookie".

In accordance with the inventive arrangements, a blended SYN cookie can be generated in a server in response to receiving a SYN request from a client. The blended SYN cookie can be stored in the low order bits of the server-selected packet sequence number field of a responsive SYN/ACK packet and can include a hash of the IP address of the server, the port of the server, a constant random seed and a date and time value. The blended SYN cookie further can include an index into a table of suitable TCP connection parameters and a client-selected packet sequence number. Notably, the table index can reference a particular set of TCP connection parameters which closely approximate, if not match, those TCP connection parameters specified by the client requesting the TCP connection with the server.

Importantly, in one aspect of the present invention, network address translation (NAT) can be used to shield a target server from a DoS attack. Specifically, a modified TCP handshake can be performed in an intermediately positioned network device such as a load balancer, router or firewall, in which the blended SYN cookies are used to authenticate a client end-point requesting a connection with the server. Once the client end-point has been authenticated, a conventional TCP handshake can be undertaken between the intermediately positioned device and the server. The intermediately positioned device, however, can perform its portion of the handshake as if the intermediately positioned device were the authenticated client.

Notably, once the conventional TCP handshake process has completed, the intermediately positioned network device can perform a NAT process on all packets communicated between the authenticated client and the server. In this regard, requisite communications parameters such as packet sequence numbers can be modified by pre-computed offsets so that neither the authenticated client nor the server need maintain an awareness of the NAT. Significantly, it will be apparent to one skilled in the art that a quasi-TCP attack cannot overcome the operation of the present invention inasmuch as only packets having a destination IP address in the NAT table will be forwarded to the server. Furthermore, the server also can remain impervious to DoS attacks as the server receives no packets until the client has been authenticated by the intermediately positioned network device.

FIG. 1 is a pictorial illustration of a system configured to withstand both a TCP SYN or ACK flood attack and a quasi-TCP attack. As shown in FIG. 1, the system 100 can include a server 106 communicatively linked to an intermediate network device 104 over a privately accessible network 110 such as a LAN or WAN. An end-point process within the server 106 can be accessed by an external client 102 over a publicly accessible network 108 such as the Internet, through an intermediate network device 104. In this regard, one skilled in art will recognize that the intermediate network device 104 can be any network device positioned within the network path between the server 106 and client 102. Such a network device can include, but is not limited to, a router, switch, firewall, NAT process, secured sockets layer (SSL) accelerator, reverse proxy, load-balancing process, load-leveling process, and the like.

The server 106 can include therein a conventional TCP communications process 106A which has been configured to establish a conventional TCP communications link using the well-known TCP three-way handshake. Control blocks containing data relating to the state of each requested TCP connection can be stored in a conventional connection setup table 106B. Thus, as will be apparent to one skilled in the art, the server 106 does not differ from any conventional network-enabled server hosting a TCP/IP communications process with which a conventional TCP communications link can be established.

The intermediate network device 104, however, unlike the server 106, can include a modified TCP communications process 104A, a SYN option table 104B, a modified connection setup table 104C, and a NAT 104D. The NAT 104D can be any suitable NAT which can perform conventional network address translation. The SYN option table 104B and modified connection setup table 104C, by comparison, can store both data relating to pre-configured TCP connection parameters, in addition to the state of requested TCP connections. Unlike the connection setup table 106B of the server 106, however, the modified connection setup table 104C is a fixed-length wrap-around table. Hence, the maximum amount of storage, e.g. resources, which can be allocated for any number of requested TCP connections can be limited by the fixed length of the modified connection setup table 104C.

The modified TCP communications process 104A can receive SYN requests from external clients such as client 102 over the Internet 108. Upon receipt of a SYN request, the modified TCP communications process 104A can extract from the SYN request the source IP address and port number, the destination IP address and port number, the client-selected packet sequence number, the client-selected MSS, and any other client-specified TCP connection parameters. The modified TCP communications process 104A, in turn, can store the extracted data in the next available slot in the modified connection setup table 104C. Additionally, the modified TCP communications process 104A can select a pre-configured set of TCP connection parameters in the SYN option table 104B which approximate the client-specified TCP connection parameters.

Figure 2:
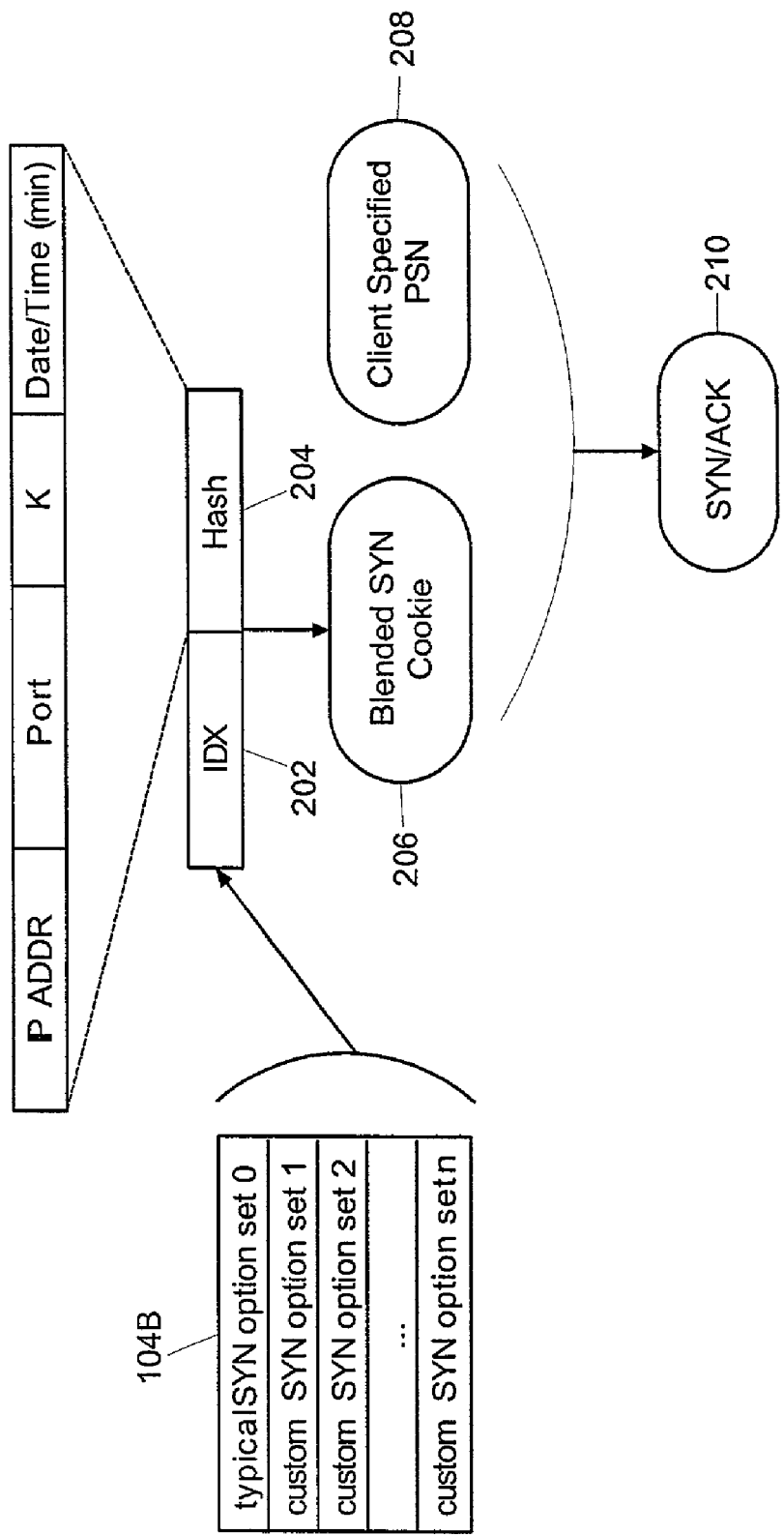
FIG. 2 is a schematic illustration of the construction of a blended SYN cookie which has been configured in accordance with the inventive arrangements; and, FIG. 3 is a block diagram illustrating a complete process of establishing a TCP connection between the requesting client and server of FIG. 1, through the intermediate network device of FIG. 1.

Unlike prior art TCP communications processes, in the present invention, once a SYN request has been received, a blended SYN cookie can be constructed based partly upon the data extracted from the SYN request. Specifically, FIG. 2 is a schematic illustration of the construction of a blended SYN cookie 206 which has been configured in accordance with the inventive arrangements. As shown in FIG. 2, in one aspect of the invention a blended SYN cookie 206 can include a hash 204 of the following data elements: an index into the SYN option table 104B, the source IP address and port, a random seed, and the date and time computed in the server 104.

The random seed preferably can be generated at boot-time and stored for use in generating the blended SYN cookie 206. Importantly, if multiple intermediate network devices 104 are used as a front-end to the server 106 (or multiple servers 106), the random seed can be distributed among the multiple intermediate network devices 104 accordingly. The hash 204 can be a one-way secured hash, for instance a hash computed according to the well-known SHA1 algorithm.

The least significant N bits of the hash can be concatenated with a binary representation of the index 202 into the SYN option table 104B. In particular, the index 202 can reference the selected set of TCP connection parameters which approximate those TCP connection parameters specified by the client 102. Optionally, the SYN option table 104B can be dynamically modified by observing typical TCP connection parameters specified by clients during nominal operations. However, in this optional embodiment, no dynamic modifications occur upon detecting a flood attack as such dynamic modifications could result in a flood attack upon the SYN options table 104B itself. As shown in FIG. 2, in one aspect of the invention the first entry in the SYN options table 104B can include a default set of TCP connection parameters defined by the TCP standard.

Notably, the number N can be selected based upon the length of the server-specified packet sequence number field in a SYN/ACK response packet 210, less the bit-length of the binary representation of the number of records in the SYN option table 104B. For example, if the SYN option table 104B contains sixteen records (four bits wide), and if the length of the server-specified packet sequence number field in the SYN/ACK response packet 210 is thirty-two bits wide, only the least-significant twenty-eight bits of the hash 204 will be concatenated with the index bits 202. The resulting concatenation is the blended SYN cookie 206.

The blended SYN cookie 206 can be placed in the server-specified packet sequence number field of a SYN/ACK response packet 210. Likewise, the client-specified packet sequence number 208 can be placed in the client-specified packet sequence number field of the SYN/ACK response packet 210. Returning now to FIG. 1, when the modified TCP connection process 104A receives a responsive ACK packet, if ever, the low-order bits of the hash can be extracted from the acknowledged packet sequence number field of the ACK response packet. Additionally, the modified TCP communications process 104A can extract from the ACK packet the source IP address and port number, the destination IP address and port number.

A new hash can be computed based upon the extracted parameters and the low-order bits of the new hash can be compared with low-order bits of the hash contained in the responsive ACK packet. Importantly, the new hash can be computed twice—once based upon the current time, and once based upon the current time less a fixed delay, for example one minute. If either of the new hashes match the extracted hash, the modified TCP communications process can conclude that the TCP connection request is legitimate.

If neither of the new hashes match the extracted hash, however, the modified TCP communications process can conclude that a SYN or ACK flood attack is underway and the ACK packets can be discarded. Notably, because the intermediate network device 104 has yet to forward any data to the server 106, the server 106 will never process the flood attack packets and will not commit resources unnecessarily in the connection setup table 106B. Furthermore, inasmuch as the modified connection setup table 104B is a fixed length wrap-around table, the unnecessarily committed resources in the modified connection setup table 104B simply will be overwritten as those resources are allocated based upon subsequent SYN requests.

Figure 3:
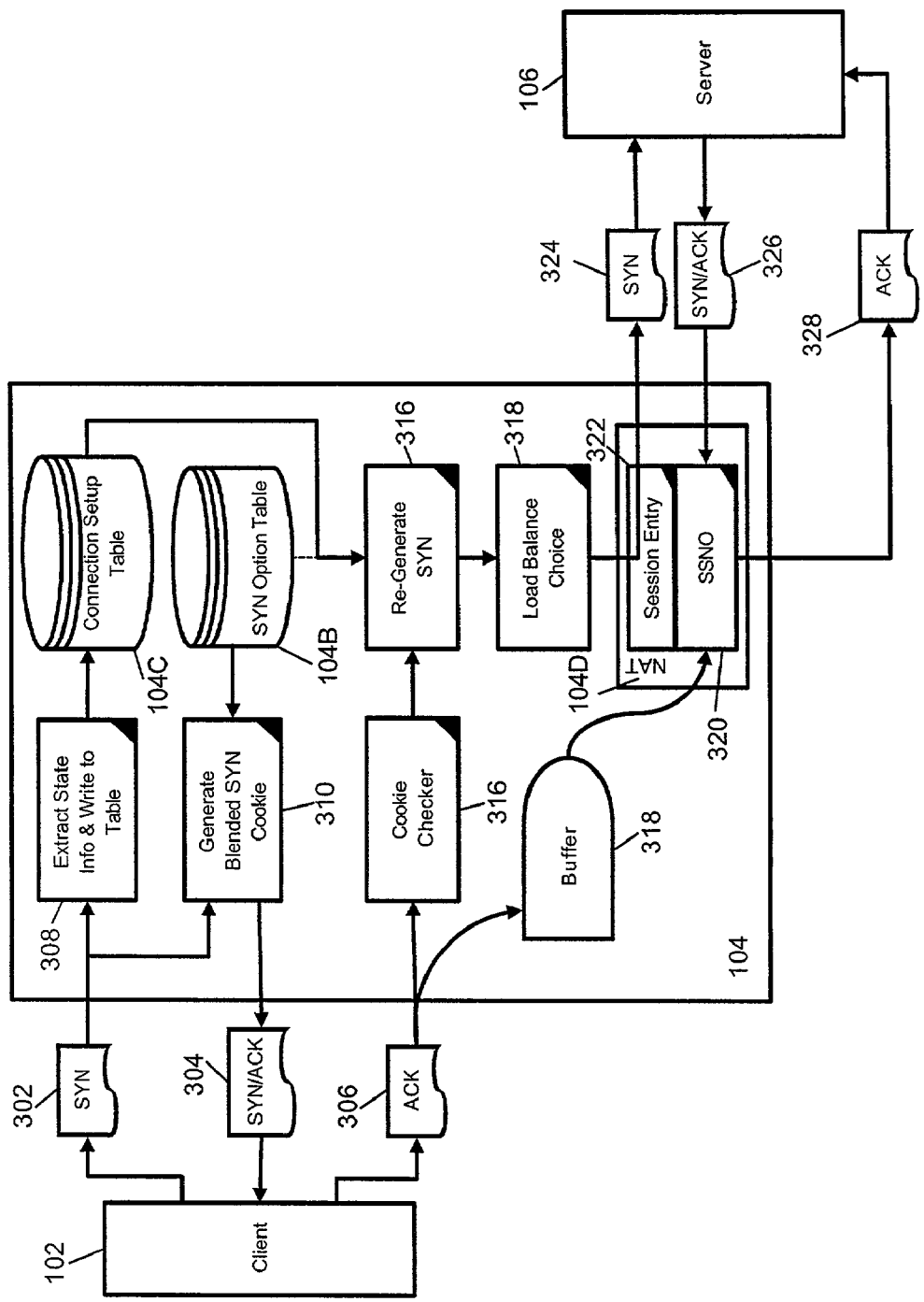

FIG. 3 is a block diagram illustrating a complete process of establishing a TCP connection between the requesting client 102 and server 106 of FIG. 1, through the intermediate network device 104. As shown in FIG. 3, upon receipt of a SYN packet 302 from the client 102, state information contained in the SYN packet 302 such as source and destination IP address, client-specified packet sequence number, and selected TCP parameters can be written to the wrap-around connection setup table 104C. Concurrently, a blended syn cookie can be generated in a cookie generation process 310. A SYN/ACK 304 can be generated based upon the blended SYN cookie and an index into the SYN Option table 104B associated with TCP communications parameters which approximate if not match the client-specified parameters in the SYN packet 302. Subsequently, the SYN/ACK 304 can be forwarded to the client 102.

If the client has legitimately attempted to establish a TCP communications link with the server 106, an ACK 306 can be forwarded from the client 102 to the intermediate network device 104. A cookie checker 312 can receive the ACK 306 and can authenticate the client 102 through the blended SYN cookie embedded in the ACK 306. Concurrently, the ACK 306 can be placed in buffer 314 for subsequent use. At this point, as it has been determined that the TCP connection request from the client 102 is legitimate, a conventional TCP handshake can be attempted with the sever 106.

Specifically, a suitable SYN packet 316 can be generated using the client-specified TCP connection parameters stored in the connection setup table 104C. In particular, the connection setup table 104C can identify within the connection setup table 104C a slot containing the source IP address, source port, destination IP address and destination port specified in the ACK packet 306. If a matching entry in the modified connection setup table 104C can be identified, indicating that such an entry had been created upon receipt of the SYN packet 302, the client-selected TCP communications parameters can be extracted and utilized in establishing a back-end connection between the server 106 and the client 102.

Otherwise, if a matching entry in the modified connection setup table 104C cannot be found, it can be assumed that a flood attack has occurred causing the modified connection setup table 104C to "wrap". In this case, a set of suitable TCP connection parameters can be identified in the SYN options table 104B referenced by the index number in the blended SYN cookie 206 of FIG. 2. Hence, in either case, the use of the least common denominator TCP connection parameters can be avoided despite the occurrence of a flood attack.

In that the process of the present invention can be performed in an intermediate network device 104 which has not been dedicated to only performing the inventive method, the intermediate network device 104 can perform its primary function 318, be that routing, switching, load-balancing, etc. Subsequently, a NAT entry 322 can be created in the NAT 104D which maps the external network address space known to the client 102 with the address space of the server 106. Subsequently, a SYN packet 324 can be constructed using the client-specified packet sequence number and the determined TCP communications parameters.

The SYN request 324 can be forwarded to the server 106. The server 106, using a conventional TCP communications process such as the process 106A of FIG. 1, can respond with a conventional SYN/ACK packet 326 from which a server-specified packet sequence number offset 320 can be computed between the server-specified packet sequence number generated previously in the intermediate network device 104, and the packet sequence number generated by the server 106. Finally, the previously formulated client ACK packet 306 stored in buffer 314 can be forwarded to the NAT 104D which can adjust the server-specified packet sequence number according to the mapping and can forward the resulting ACK packet 326 to the server 106. At this point, the NAT 104D can route session packets between the client 102 and the server 106.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of producing a blended synchronization (SYN) cookie for use in a three-way handshake process comprising the steps of:
    identifying within a SYN packet a source network address and desired communications session parameters;
    retrieving an index value into a table of pre-configured sets of communications session parameters, said index value referencing one of said sets which approximates said desired communications parameters;
    computing a hash value based upon said source network address, a constant seed and current date and time data; and,
    combining said computed hash value with said index value, said combination forming the blended SYN cookie.

2. The method of claim 1, wherein said combining step comprises:
    reducing said computed hash value by N most significant binary digits to accommodate N binary digits required to represent said index value; and,
    combining said reduced hash value with said index value, said combination forming the blended SYN cookie.

3. A three-way handshake method, the three-way handshake comprising an initial request, an intermediate response to the initial request, and a final acknowledgment of the intermediate response, the method comprising the steps of:
    extracting synchronization data from the initial request;
    storing said synchronization data in a fixed length, wrap-around table;
    based upon session parameters contained in said synchronization data, acquiring an index into a table of pre-configured sets of session parameters;
    computing an initial hash value based upon at least part of said synchronization data;
    combining said initial hash value and said acquired index and placing said combination into the intermediate response to the initial request; and,
    responsive to receiving the final acknowledgment of the intermediate response, extracting acknowledgment data from the final acknowledgment, identifying said initial hash value in said acknowledgment data, computing a new hash value based upon at least part of said acknowledgment data, comparing said new hash value with said initial hash value, and if said hash values do not match, discarding the final acknowledgment.

4. The three-way handshake method of claim 3, further comprising the step of, if said hash values match, locating said session parameters in said fixed length, wrap-around table and establishing a communications session using said located session parameters.

5. The three-way handshake method of claim 4, further comprising the step of, if said session parameters cannot be located, identifying said acquired index in said acknowledgment data, retrieving a pre-configured set of communication parameters based upon said acquired index, and establishing a communications session using said located session parameters.

6. The three-way handshake method of claim 5, wherein said establishing step comprises:
    adding a mapping in a network address translation (NAT) process between a source end-point of the initial request and a destination end-point specified in said synchronization data;
    performing a three-way handshake with said destination end-point, said three-way handshake comprising the steps of generating a SYN request containing data reconstructed from said initial request, receiving a SYN/ACK response, computing a server packet sequence number offset based upon a sequence number specified in said SYN/ACK and said combination;
    modifying said acknowledgment data with said offset, and forwarding said acknowledgment data as an ACK to said destination end-point, said three-way handshake establishing a communications link between said source and destination end-points; and,
    routing data in said NAT between said source and destination end-points.

7. The three-way handshake method of claim 3, further comprising the steps of:
   observing said session parameters in said synchronization data; and,
   tuning said table of pre-configured sets of session parameters based upon said observed session parameters.

8. A communications handshake system comprising:
   a communications process configured to receive and respond to requests to establish data communications sessions, said requests comprising synchronization (SYN) packets and acknowledgment (ACK) packets;
   a fixed length, wrap-around table configured to store desired session parameters extracted from said SYN packets;
   a table of pre-configured session parameters which can be used to approximate said desired session parameters; and,
   a blended SYN cookie generator configured to combine SYN cookies with an index into said table of pre-configured session parameters, said index referencing a set of pre-configured session parameters which approximate corresponding ones of said desired session parameters; whereby said communications process both can authenticate said ACK packets by comparing hash values contained in said SYN cookies with hash values generated in response to receiving said ACK packets, and also can establish said data communication sessions using said desired session parameters in said fixed length, wrap-around table, or said approximated session parameters where said desired session parameters are not found in said fixed length wrap-around table.

9. The communications handshake system of claim 8, further comprising a network address translator configured to perform network address translation between end-points in said established communications sessions.

10. The communications handshake system of claim 8, wherein said SYN cookie comprises a hash value computed from a network address, a seed value and a date and time value.

11. A machine readable storage having stored thereon a computer program for performing a three-way handshake method, the three-way handshake comprising an initial request, an intermediate response to the initial request, and a final acknowledgment of the intermediate response, the computer program comprising a routine set of instructions for causing the machine to perform the steps of:
   extracting synchronization data from the initial request;
   storing said synchronization data in a fixed length, wrap-around table;
   based upon session parameters contained in said synchronization data, acquiring an index into a table of pre-configured sets of session parameters;
   computing an initial hash value based upon at least part of said synchronization data;
   combining said initial hash value and said acquired index and placing said combination into the intermediate response to the initial request; and,
   responsive to receiving the final acknowledgment of the intermediate response, extracting acknowledgment data from the final acknowledgment, identifying said initial hash value in said acknowledgment data, computing a new hash value based upon at least part of said acknowledgment data, comparing said new hash value with said initial hash value, and if said hash values do not match, discarding the final acknowledgment.

12. The machine readable storage of claim 11, further comprising, if said hash values match, locating said session parameters in said fixed length, wrap-around table and establishing a communications session using said located session parameters.

13. The machine readable storage of claim 12, further comprising, if said session parameters cannot be located, identifying said acquired index in said acknowledgment data, retrieving a pre-configured set of communication parameters based upon said acquired index, and establishing a communications session using said located session parameters.

14. The machine readable storage of claim 13, wherein said establishing step comprises:
   adding a mapping in a network address translation (NAT) process between a source end-point of the initial request and a destination end-point specified in said synchronization data
   performing a three-way handshake with said destination end-point, said three-way handshake comprising the steps of generating a SYN request containing data reconstructed from said initial request, receiving a SYN/ACK response, computing a server packet sequence number offset based upon a sequence number specified in said SYN/ACK and said combination;
   modifying said acknowledgment data with said offset, and forwarding said acknowledgment data as an ACK to said destination end-point, said three-way handshake establishing a communications link between said source and destination end-points; and,
   routing data in said NAT between said source and destination end-points.

15. The machine readable storage of claim 11, further comprising the steps of:
   observing said session parameters in said synchronization data; and,
   tuning said table of pre-configured sets of session parameters based upon said observed session parameters.

* * * * *